Nov. 22, 1966  E. DINGLINGER  3,286,841
MAGNETIC FILTER MECHANISM
Filed Sept. 13, 1962  4 Sheets-Sheet 1

INVENTOR
ERICH DINGLINGER
BY
Barnes, Kisselle, Raisch & Choate
ATTORNEYS

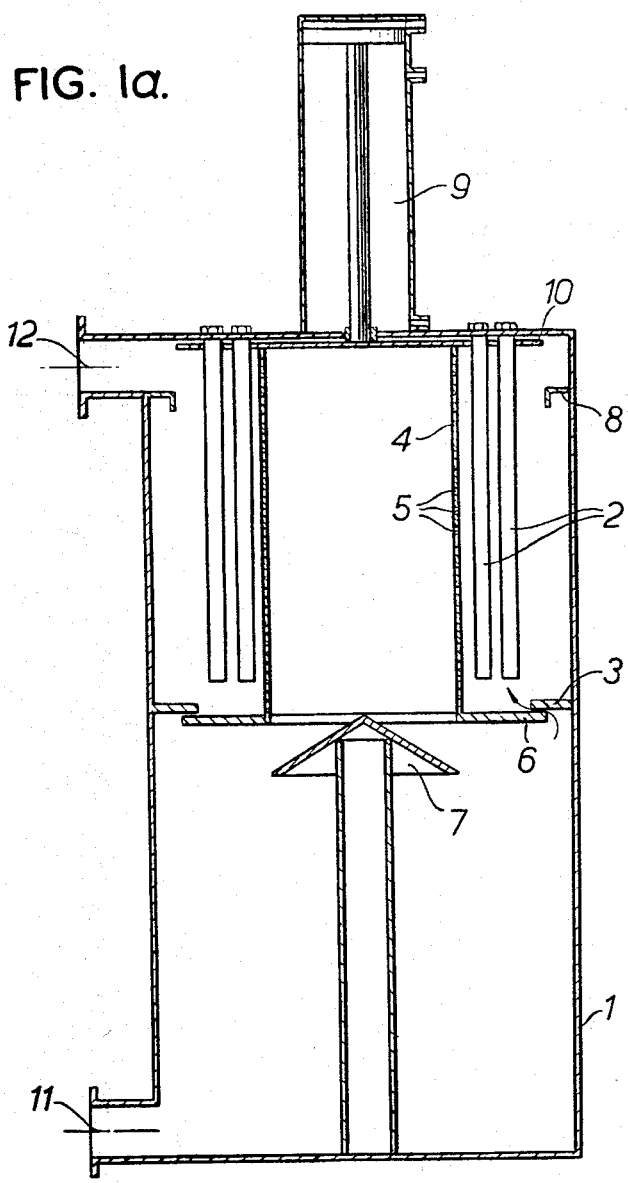

Nov. 22, 1966   E. DINGLINGER   3,286,841
MAGNETIC FILTER MECHANISM
Filed Sept. 13, 1962   4 Sheets-Sheet 3

INVENTOR
ERICH DINGLINGER
BY
Barnes, Kisselle, Raisch & Choate
ATTORNEYS

INVENTOR
ERICH DINGLINGER
BY
Barnes, Kisselle, Raisch & Choate
ATTORNEYS

United States Patent Office 3,286,841
Patented Nov. 22, 1966

3,286,841
MAGNETIC FILTER MECHANISM
Erich Dinglinger, Heinrich-Heinestr. 50,
Bremen, Germany
Filed Sept. 13, 1962, Ser. No. 223,563
Claims priority, application Germany, Sept. 19, 1961,
D 37,126
3 Claims. (Cl. 210—223)

This invention relates to filters and particularly to a magnetic filter mechanism.

It is an object of the invention to provide a magnetic filter mechanism wherein the direction of flow of fluid, either liquid or gas, through the filter mechanism can be controlled and varied.

It is a further object of the invention to provide such a magnetic filter mechanism which can be readily cleaned.

In the drawings:

FIG. 1a is a view similar to FIG. 1 showing the parts in a different operative position.

Figure 1:
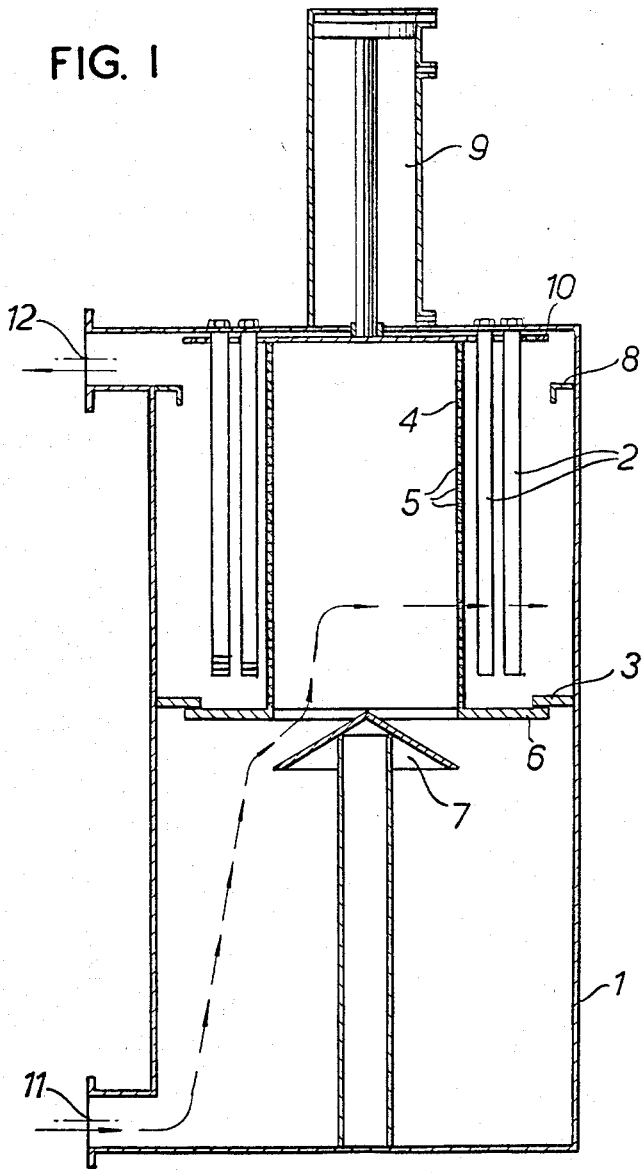
FIG. 1 is a vertical sectional view through a magnetic filter mechanism embodying the invention.

Referring to FIG. 1, the magnetic filter mechanism embodying the invention comprises a main body or casing 1 which is closed and may be of any desired cross section. Casing 1 has an inlet 11 at which an inlet valve is positioned at the lower end thereof. An outlet 12 is provided at the upper end of the casing 1.

A fixed sealing ring 3 positioned within the casing 1 divides the casing into an upper and a lower chamber. A plurality of magnetic cells are mounted on the top wall of the casing 1 and extend generally vertically downwardy within the upper chamber. Each cell is of well-known construction in the art and comprises a plurality of generally disc-shaped permanent magnets which have opposed north and south surfaces. The magnets are stacked in a column with the identical poles opposite one another and small plastic discs therebetween, the entire stack being enclosed in a thin tube of non-magnetic material. The theory on which such magnetic cells operate is that as a fluid such as a liquid or gas is moved past the cells, the contaminating particles therein are drawn to the magnets permitting the fluid to pass on in a cleaned state.

As further shown in FIG. 1, a shell or tube 4 of non-magnetic material having an imperforate top wall 10 and an open bottom is mounted for vertical movement in the casing 1 by a piston motor 9 fixed to the top wall of the casing 1 and having its piston rod connected to the top wall 10 of the tube 4. Piston motor 9 may be hydraulic, pneumatic or other suitable construction.

The side wall of the shell 4 is perforated to form a mechanical filter member. The wall may be made of screen, plates, tubes, bars or vanes such as used in the turbine art in order to form openings 5. The nature of the openings is selected in accordance with the fluid being filtered and may comprise holes, jet aperatures, slots or a sinuous path formed by plates.

The tube 4 is formed with a flange 6 at its lower end which cooperates with sealing ring 3 to isolate the exterior of the tube 4 from the lower chamber when the tube 4 is in its uppermost position. A fixed conical valve 7 is mounted within the casing 1 and cooperates with the lower end of the tube 4 to control the flow of fluid as presently described.

In the position shown in FIG. 1, all of the contaminated fluid, either liquid or gas, entering through inlet 11 passes upwardly between the flange 6 and the fixed valve 7 to the interior of the tube and thereafter through the openings 5 in the tube 4 generally radially outwardly past the magnetic cells 2, that is, normal to the magnetic cells 2. The clean fluid then passes out of the outlet 12 of the casing 1.

Figure 1B:
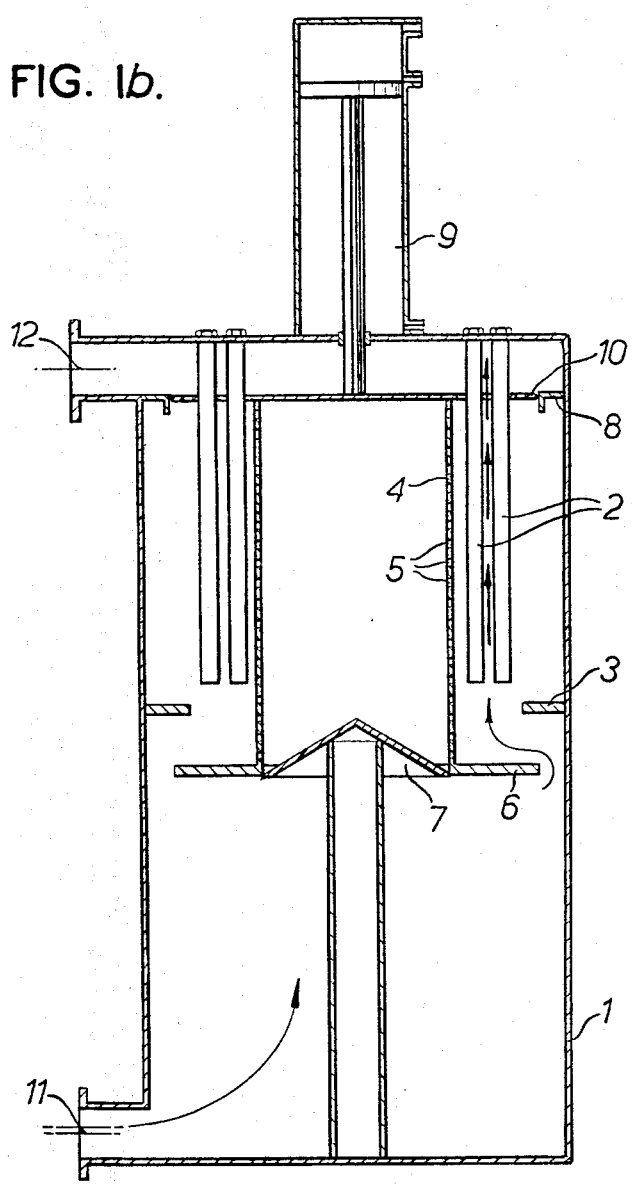
FIG. 1b is a view similar to FIG. 1 showing the parts in a further operative position.

However, if the shell 4 is lowered to the position shown in FIG. 1a, a portion of the contaminated fluid is permitted to flow between the flange 6 and the sealing ring 3 so that a part of the fluid passes in the direction as described in connection with FIG. 1 while another part of the fluid passes generally upwardly around the tube 4 and between the cells 2. If the shell 4 is lowered to an even greater degree, a greater portion of the fluid will pass between the flange 6 and sealing ring 3 upwardly around the tube 4 and between the cells 2. If the tube 4 is lowered to a position where it engages the fixed valve 7 and seals off the flow between the flange 6 and the valve 7 (FIG. 1b), the entire volume of contaminated fluid is caused to pass between the flange 6 and sealing ring 3 generally vertically upwardly parallel to the magnetic cells 2. As shown in FIG. 1b, the top wall 10 of the tube 4 extends radially outwardly beyond the confines of the side wall of the tube 4 and cooperates with a baffle ring 8 fixed to the inside of the casing 1 to insure that the contaminated fluid will pass through the magnetic field before passing upwardly through the openings in the peripheral portion of the top wall 10.

It can thus be seen that it is possible to control the percentage of fluid which passes vertically or horizontally with relation to the magnetic cells 2 depending upon the character of the contaminants in the fluid.

Figure 1C:
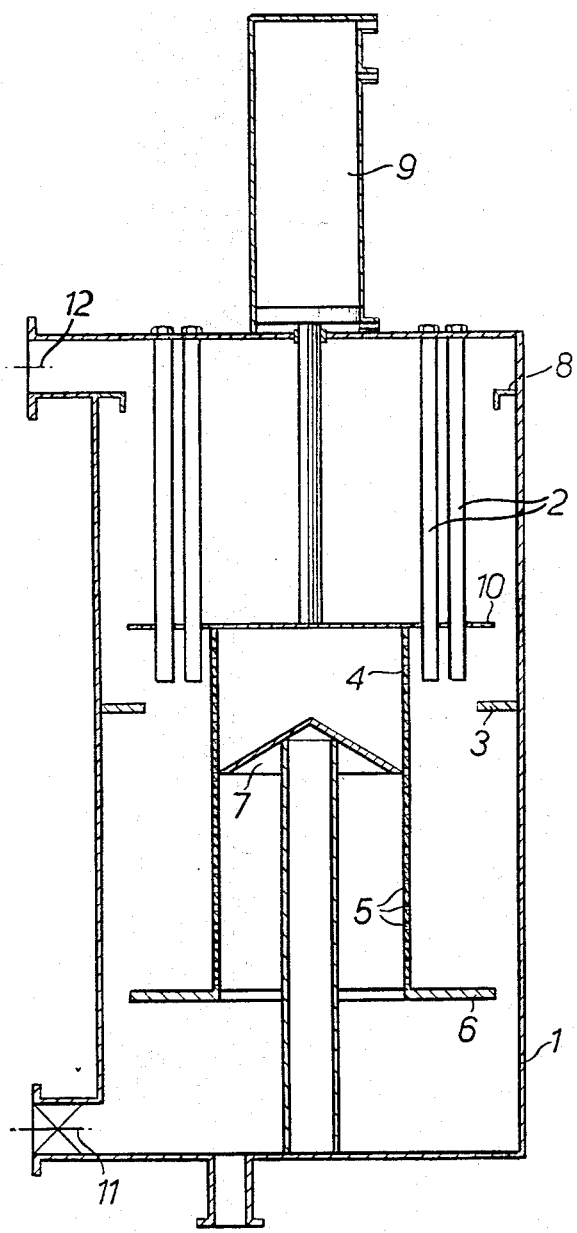
FIG. 1c is a view similar to FIG. 1 showing the relative positions of the parts during cleaning of the mechanism.
Figure 1D:
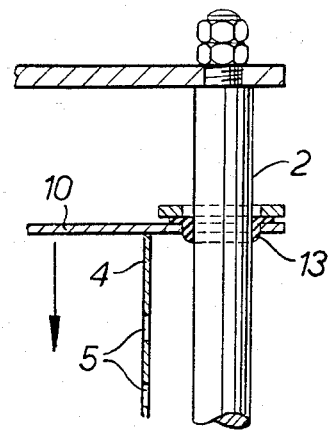
FIG. 1d is a vertical sectional view on an enlarged scale of a portion of the apparatus shown in FIG. 1.

In order to permit cleaning of the magnetic filter mechanism, the tube 4 is moved downwardly to the position shown in FIG. 1c, the top wall 10 being formed with wipers 13 surrounding the cells which wipe the cells clean of contaminants. As shown in FIG. 1d, the wipers 13 are formed from rubber, plastic or other suitable material and surround the cells 2. In the position shown in FIG. 1c, the inlet 11 is closed and the flow of fluid is reversed permitting the contaminants to flow outwardly through a suitable opening in the bottom portion of the casing 1 (not shown).

It can be appreciated that instead of moving the tube 4, the cells 2 can be movable providing a similar relative arrangement.

It will be readily apparent to persons skilled in the art that the control of the piston motor 9 can be made manual or automatic as desired.

It can thus be seen that there has been provided a magnetic filter mechanism which permits the direction of flow of the contaminated fluid to be controlled either normal or vertical to the magnetic cells or at any intermediate direction thereto. In addition, the magnetic filter mechanism can be readily cleaned.

I claim:

1. In a magnetic filter system, the combination comprising
   a casing having an inlet adjacent the lower end therein through which contaminated fluid is directed and an outlet adjacent the upper end thereof through which cleaned fluid is removed,
   a plurality of magnetic cells positioned within said casing,
   each said cell comprising a plurality of permanent magnets assembled in an elongated vertical stack,
   a filter tube of non-magnetic material having a perforated side wall thereof mounted in said casing with its axis extending generally vertically and the magnetic cells positioned adjacent the exterior of the perforated side wall of said tube, means for moving said filter tube generally vertically and parallel relative to said magnetic cells, said filter tube having an imperforate top wall closing the interior thereof, said filter tube having an open bottom wall, said filter tube having an imperforate peripheral flange on the lower end thereof, a generally horizontal sealing ring on the interior of the casing intermediate the top and bottom of said casing cooperating with said flange to direct inflow to either the exterior or the interior of the filter tube, and a fixed valve on the interior of the casing cooperating with the lower end of the filter tube to either open or close the tube, whereby when the lower end of said filter tube is in engagement with said fixed valve, all of said contaminated fluid flows exteriorly of said filter tube, when said filter tube is in contact with the sealing ring, all of the contaminated fluid flows into said filter tube and when the filter tube is in an intermediate position between the sealing ring and the fixed valve, some of the contaminated fluid flows exteriorly of said filter tube.

2. The combination set forth in claim 1 including means mounted on said filter tube and cooperating with the surface of the magnetic cells whereby the surface of the cells is wiped when the filter tube is moved relative thereto.

3. The combination set forth in claim 1 including a pervious sealing flange on the upper end of the filter tube, and a cooperating ring on the interior of the casing whereby the passage of the contaminated fluid past the magnetic cells is insured.

References Cited by the Examiner
UNITED STATES PATENTS 2,800,230   7/1957   Thoma _____ 210—223

REUBEN FRIEDMAN, *Primary Examiner.*

HERBERT L. MARTIN, *Examiner.*

F. W. MEDLEY, *Assistant Examiner.*